(12) United States Patent
Jones et al.

(10) Patent No.: US 9,191,707 B2
(45) Date of Patent: Nov. 17, 2015

(54) AUTOMATIC DISPLAY OF USER-SPECIFIC FINANCIAL INFORMATION BASED ON AUDIO CONTENT RECOGNITION

(71) Applicant: Bank of America, Charlotte, NC (US)

(72) Inventors: Alicia C. Jones, Fort Mill, SC (US); Matthew Perkins, Charlotte, NC (US); James E. Burgess, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 345 days.

(21) Appl. No.: 13/672,402

(22) Filed: Nov. 8, 2012

(65) Prior Publication Data

US 2014/0129232 A1   May 8, 2014

(51) Int. Cl.
*G10L 21/00* (2013.01)
*H04N 21/462* (2011.01)
*G06Q 40/00* (2012.01)
(Continued)

(52) U.S. Cl.
CPC .......... *H04N 21/4622* (2013.01); *G06Q 40/12* (2013.12); *H04H 60/58* (2013.01); *H04N 21/233* (2013.01); *H04N 21/251* (2013.01); *H04N 21/25891* (2013.01); *H04N 21/2665* (2013.01); *H04N 21/4126* (2013.01); *H04N 21/41407* (2013.01); *H04N 21/4316* (2013.01); *H04N 21/4394* (2013.01); *H04N 21/43637* (2013.01); *H04N 21/4415* (2013.01); *H04N 21/454* (2013.01); *H04N 21/4532* (2013.01); *H04N 21/47805* (2013.01); *H04H 60/46* (2013.01); *H04N 21/25875* (2013.01); *H04N 21/4223* (2013.01); *H04N 21/42203* (2013.01); *H04N 21/42676* (2013.01); *H04N 21/4753* (2013.01); *H04N 21/6581* (2013.01)

(58) Field of Classification Search
CPC ................................ G06F 17/30026
USPC ........................................... 704/275
See application file for complete search history.

(56) References Cited

U.S. PATENT DOCUMENTS 5,155,591 A   10/1992   Wachob
5,594,779 A    1/1997   Goodman
(Continued)

FOREIGN PATENT DOCUMENTS

WO   2007/104026 A2   9/2007

OTHER PUBLICATIONS

Shazam [online] [retrieved on Nov. 26, 2012]. Retrieved from the Internet< URL: http://www.engagetv.tv/?portfolio=shazam-super-bowl>.

(Continued)

*Primary Examiner* — Jakieda Jackson
(74) *Attorney, Agent, or Firm* — Banner & Witcoff, Ltd.; Michael A. Springs (57) ABSTRACT

Aspects herein describe at least a new method, system, and computer readable storage media for recognizing the content of the audio. A computing device determines whether the content comprises one or more financial products and services offered by a financial institution, correlates the one or more financial products and services with a profile of a person, determines a subset of the one or more financial products and services that are of interest to the person based on the correlation, and transmits data related to the subset to a television for viewing by the person. The subset of the one or more products and services are displayed on a portion of the screen of the television.

15 Claims, 5 Drawing Sheets

(51) Int. Cl.
  *H04N 21/431* (2011.01)
  *H04N 21/478* (2011.01)
  *H04N 21/233* (2011.01)
  *H04N 21/25* (2011.01)
  *H04N 21/2665* (2011.01)
  *H04N 21/414* (2011.01)
  *H04N 21/439* (2011.01)
  *H04N 21/4415* (2011.01)
  *H04N 21/45* (2011.01)
  *H04N 21/454* (2011.01)
  *H04N 21/41* (2011.01)
  *H04N 21/4363* (2011.01)
  *H04H 60/58* (2008.01)
  *H04N 21/258* (2011.01)
  *H04N 21/422* (2011.01)
  *H04N 21/4223* (2011.01)
  *H04N 21/426* (2011.01)
  *H04N 21/475* (2011.01)
  *H04N 21/658* (2011.01)
  *H04H 60/46* (2008.01)

(56) References Cited

U.S. PATENT DOCUMENTS

| | | |
|---|---|---|
| 5,636,346 A | 6/1997 | Saxe |
| 5,694,455 A | 12/1997 | Goodman |
| 6,119,098 A | 9/2000 | Guyot et al. |
| 6,182,050 B1 | 1/2001 | Ballard |
| 6,184,926 B1 | 2/2001 | Khosravi et al. |
| 6,269,173 B1 | 7/2001 | Hsien |
| 6,298,330 B1 | 10/2001 | Gardenswartz et al. |
| 6,385,592 B1 | 5/2002 | Angles et al. |
| 6,404,900 B1 | 6/2002 | Qian et al. |
| 6,408,278 B1 | 6/2002 | Carney et al. |
| 6,484,148 B1 | 11/2002 | Boyd |
| 6,553,345 B1 | 4/2003 | Kuhn et al. |
| 6,643,620 B1 | 11/2003 | Contolini et al. |
| 6,785,906 B1 | 8/2004 | Gaughan et al. |
| 6,904,168 B1 | 6/2005 | Steinberg et al. |
| 7,047,554 B1 | 5/2006 | Lortz |
| 7,319,779 B1 | 1/2008 | Mummareddy et al. |
| 7,383,203 B1 | 6/2008 | Feldstein et al. |
| 7,508,535 B2 | 3/2009 | Hart et al. |
| 7,640,272 B2 | 12/2009 | Mahajan et al. |
| 8,700,512 B1 * | 4/2014 | Kuznetsov ............ 705/35 |
| 2002/0016740 A1 | 2/2002 | Ogasawara |
| 2003/0018475 A1 | 1/2003 | Basu et al. |
| 2003/0110038 A1 | 6/2003 | Sharma et al. |
| 2003/0225825 A1 | 12/2003 | Healey et al. |
| 2005/0010409 A1 | 1/2005 | Hull et al. |
| 2005/0243166 A1 | 11/2005 | Cutler |
| 2005/0243168 A1 | 11/2005 | Cutler |
| 2006/0206912 A1 | 9/2006 | Klarfeld et al. |
| 2007/0118873 A1 | 5/2007 | Houh et al. |
| 2008/0140385 A1 | 6/2008 | Mahajan et al. |
| 2008/0146234 A1 | 6/2008 | Kim |
| 2008/0243614 A1 | 10/2008 | Tu et al. |
| 2011/0247042 A1 | 10/2011 | Mallinson |
| 2011/0281566 A1 | 11/2011 | Davis et al. |
| 2011/0289114 A1 | 11/2011 | Yu et al. |
| 2011/0289530 A1 | 11/2011 | Dureau et al. |
| 2012/0006129 A1 * | 1/2012 | Tokuda et al. ........... 73/862.629 |
| 2012/0227073 A1 | 9/2012 | Hosein et al. |
| 2014/0074688 A1 * | 3/2014 | Shvarts et al. ............ 705/38 |

OTHER PUBLICATIONS

Shazam Music [online] [retrieved on Nov. 26, 2012]. Retrieved from the Internet<URL: http://www.shazam.com>.

Automatic Content Recognition [online] [retrieved on Nov. 27, 2012]. Retrieved from the Internet<URL: http://www.intrasonics.com/acr.html>.

Ellis, L. TV of Tomorrow 2011 [online], Dec. 12, 2011 [retrieved on Dec. 27, 2012]. Retrieved from the Internet, URL: http://www.translation-please.com/column.cfm?columnid=393.

International Search Report and Written Opinion from related PCT Application No. PCT/US2013/054689, mailed Nov. 26, 2013, pp. 1-8.

\* cited by examiner

AUTOMATIC DISPLAY OF USER-SPECIFIC FINANCIAL INFORMATION BASED ON AUDIO CONTENT RECOGNITION

FIELD

Generally, aspects described herein relate to the automatic display of user-specific financial information based on audio content recognition.

BACKGROUND

While a person watches a television program, one or more products may be of interest to him or her. However, while watching the program, the viewer may want to obtain information related to one or more products and/or services presented in the program. While the viewer may be interested in such products and/or services, it may be difficult or inconvenient to obtain such information while the viewer's attention is focused on the content of the program.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

In order to address the above shortcomings and additional benefits that will be realized upon reading the disclosure, aspects herein describe new methods and systems for automatically displaying user-specific financial information based on audio content recognition.

Aspects herein describe at least a method, system, and computer readable storage media for performing audio content recognition of an audio signal, determining whether the content describes one or more products and services offered by an organization, correlating the one or more products and services with a profile of a person, determining a subset of the one or more products and services that are of interest to the person based on the correlation, and transmitting data related to the subset to a television for viewing by the person.

The various aspects of the illustrative embodiments are substantially shown in and/or described in connection with at least one of the following figures, as set forth more completely in the claims.

These and other advantages, aspects, and novel features of the present disclosure, as well as details of illustrated embodiments, thereof, will be more fully understood from the following description and drawings.

BRIEF DESCRIPTION OF THE DRAWINGS

Having thus described aspects of the disclosure in general terms, reference will now be made to the accompanying drawings, which are not necessarily drawn to scale, and wherein:

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

Various aspects described herein may be embodied as a method, a data processing system or apparatus, or a computer program product. Accordingly, those aspects may take the form of an entirely hardware embodiment, an entirely software embodiment, or an embodiment combining software and hardware aspects. Furthermore, such aspects may take the form of a computer program product stored in one or more computer-readable storage media having computer-readable program code, or instructions, embodied in or on the storage media. Any suitable computer readable storage media may be utilized, including magnetic hard disk drives, optical discs such as CDs and DVDs, and/or other optical media or optical drives, NAS (network attached storage) devices, and/or any combination thereof. In addition, various signals, such as one or more digital signals, may comprise data (uncoded, coded, or encrypted) that may be transmitted between computing devices. The computing devices may comprise a digital appliance such as a smart television (TV), a desktop computer, laptop computer, and one or more portable wireless computing devices (e.g., a smartphone, cellphone, PDA, notebook, notepad), or any kind of computing device comprising a processor and memory which is capable of executing firmware and/or software.

Figure 1:
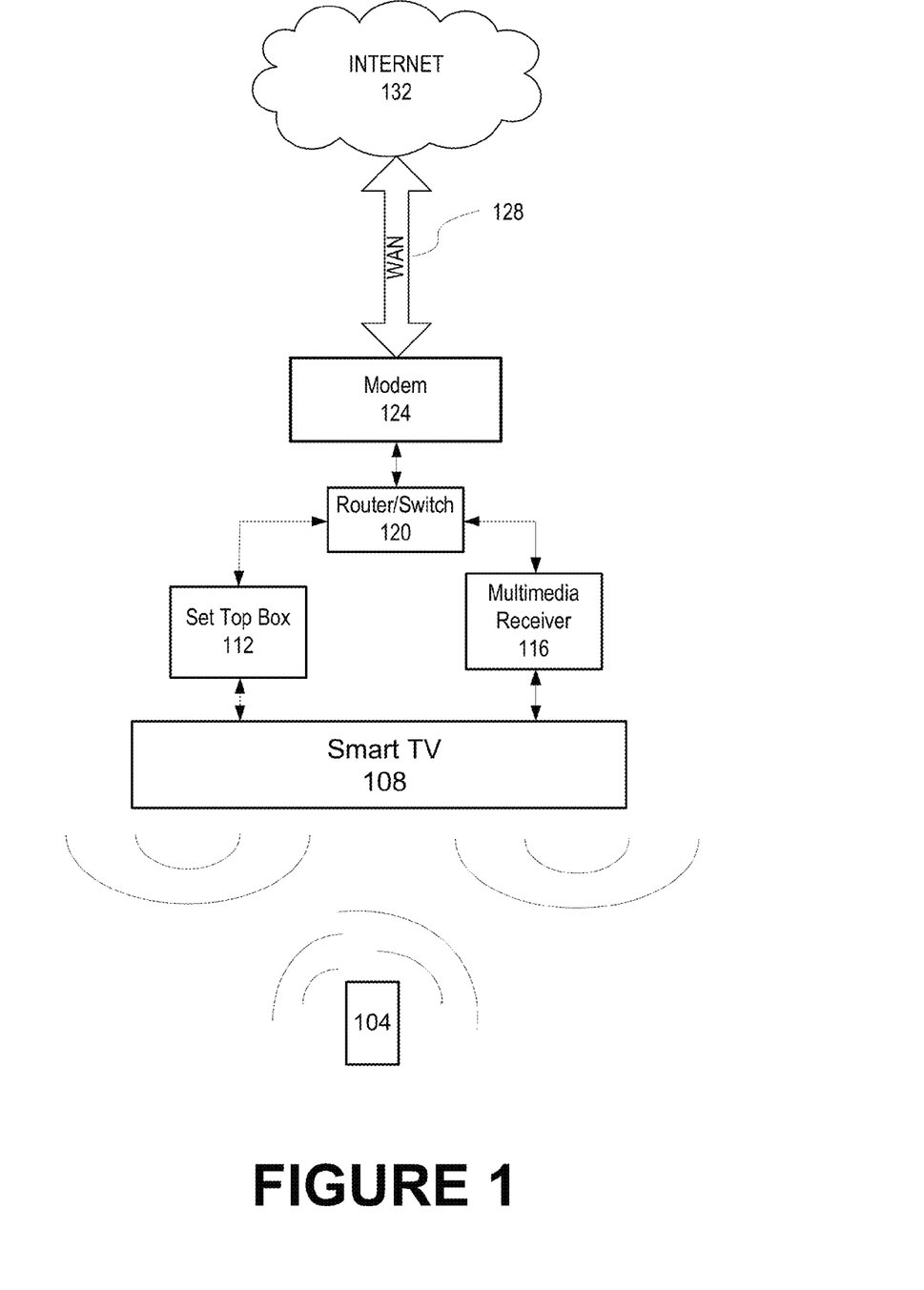
FIG. 1 illustrates an operating environment in which various aspects of the disclosure may be implemented.

FIG. 1 illustrates an operating environment in which various aspects of the disclosure may be implemented. The operating environment includes a wireless communication device 104, a smart television 108, a set top box 112, a multimedia receiver 116, a router/switch 120, and a modem 124. The wireless communication device 104 may be communicatively coupled to smart television 108 by way of a wireless data communications link. The wireless communication device 104 may communicate to the smart television (TV) 108 by using one or more wireless communications protocols including Wi-Fi, Bluetooth, NFC, and the like. Each of the wireless communication device 104 and the smart TV 108 may comprise a transceiver and antenna.

The data may comprise one or more control signals, commands, applications, a movie, a slide show, a picture, or any other media, for example. The control signals and commands may comprise data used for authenticating the wireless communication device 104 with the smart TV 108. The wireless communication device (WCD) 104 may transmit commands and/or control signals to pair itself with the smart TV 108. As illustrated, the smart TV 108 may be connected to the set top box 112 and a multimedia receiver 116.

The smart TV 108 may comprise a display, a microphone, and a camera. The microphone and camera may be utilized when the smart TV operates in a voice and gesture control mode. The smart TV 108 may be able to authenticate a user by way of recognizing the facial features of the user. The smart TV 108 may execute facial recognition software to perform facial recognition of the viewer of the smart TV and/or user of the wireless communication device. The smart TV 108 may be able to authenticate a command uttered by a user when the audio signal received by the microphone is analyzed and determined to be characteristic of the user.

Authentication of the viewer or user may be performed using facial recognition and/or audio recognition. The frequency components of the audio signal may be used to characterize a user's voice, for example. While being able to recognize the facial features of a viewer or user, the camera may also be used in gesture control mode to receive gesture based commands made by the user or viewer. A user, who has been authenticated using facial recognition, may be able to use his or her hand as a cursor to control and select objects on the display of the smart TV 108, for example.

While the set top box 112 may allow for reception of satellite and/or cable based programming, the set top box 112 may also comprise a camera and a microphone which provides for the implementation of voice and gesture control. The multimedia receiver 116 may provide reception of various programming obtained through the Internet. While the multimedia receiver 116 may allow for reception of satellite and/or cable based programming, the multimedia receiver 112 may also comprise a camera and a microphone which may be used to provide voice and gesture control functionality. The multimedia receiver 116 may comprise any receiver capable of downloading streams of multimedia data from the Internet. The multimedia receiver 116 may source the multimedia data from a variety of content providers. The modem 124 may interface with a wide area network (WAN) 128 at one port and with the router/switch at another port. The port at the WAN 128 may comprise a coaxial connection. The port at the router/switch may comprise an Ethernet connection. As illustrated in FIG. 1, the WAN 128 may be communicatively coupled to the Internet 132. While a smart television 108 has been described in the embodiment shown in FIG. 1, the smart television 108 may alternatively comprise any type of computing device, multimedia viewing device, or digital appliance capable of providing video from a display and audio from one or more speakers. The computing device may comprise a computer, such as a personal computer (PC), laptop, notepad, for example, capable of providing online streaming of any multimedia data it receives by way of the Internet 132.

Figure 2:
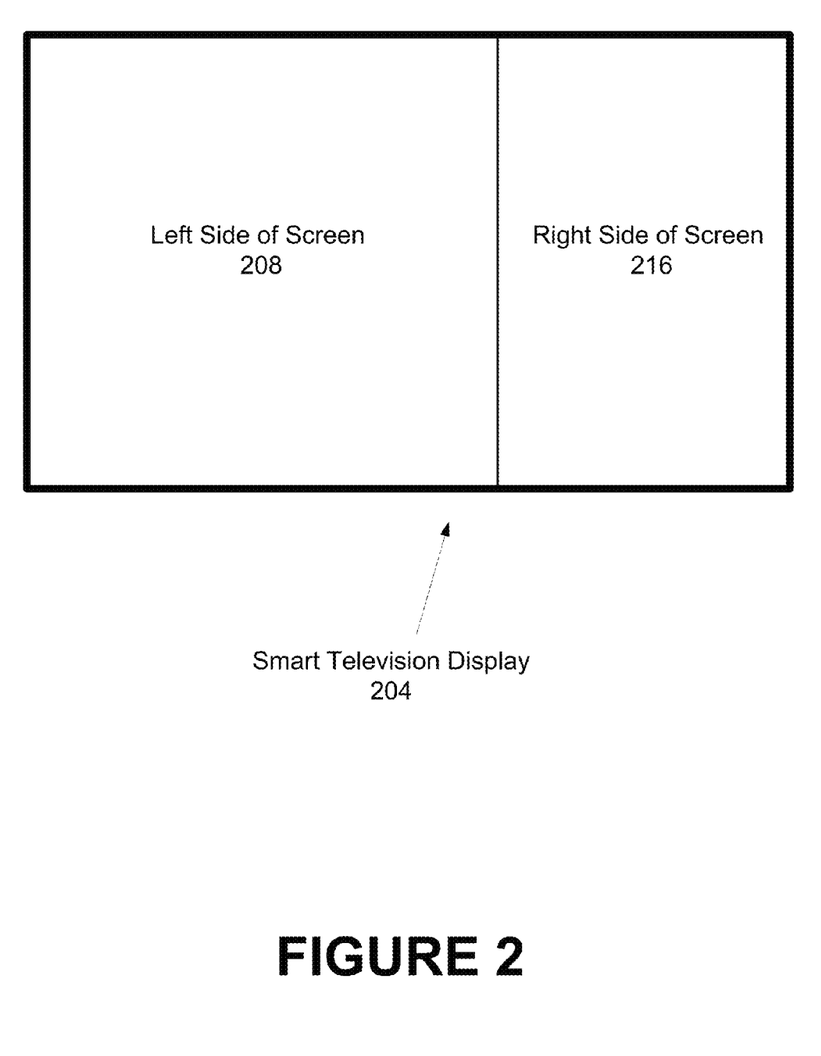
FIG. 2 is a block diagram of the display of the smart TV described in connection with FIG. 1 in accordance with an embodiment of the disclosure.

FIG. 2 is a block diagram of the display of the smart TV described in connection with FIG. 1 in accordance with an embodiment of the disclosure. FIG. 2 illustrates an exemplary view or display of the smart TV 204 in a split screen mode comprising two subscreens. The display or screen 204 may be divided or configured into multiple subscreens in which each sub-screen provides its own programming.

In one embodiment, the display or screen 204 may be divided into a first subscreen and a second subscreen. FIG. 2 illustrates a left side of screen 208 and a right side of screen 216 when the smart TV is operated in a split-screen mode. Normally, the display 204 provides a multimedia program that occupies the entire screen. However, when the smart TV is operated in split-screen mode, the first subscreen or left side of the screen 208 may be used to display the normally scheduled programming while the second subscreen or right side of the screen 216 may be used to display optional or additional programming transmitted to the user or viewer.

The optional or additional programming displayed on the second subscreen may comprise financial information associated with the programming displayed on the first subscreen. For example, a financial program or news program may provide information related to stock prices or mutual fund prices for the close of the day. When a particular stock is described by the financial program or new program, the right side of the screen 216 may be used to provide additional information related to the stock. The additional stock information may be generated based on audio cues or control signals generated from a user's wireless communication device to the smart TV.

Additionally, when placed in an appropriate mode, the user's wireless communication device (WCD) may monitor the audio transmitted by the smart TV. The audio may be analyzed by the WCD using audio content recognition. After processing the audio signal using audio content recognition hardware and/or software resident in the WCD or in a server or computer of a financial institution, the content may be correlated with the products and/or services that may be of interest to the user, based on a user profile that is stored in a database. The database may be stored in a memory of the WCD, for example.

Otherwise, the database may be stored at a server of a financial institution such as a bank or brokerage firm holding the investment accounts of the user, for example. The financial institution may store a financial profile of the user which may include various financial characteristics of the user. The financial profile may include the income of the user, the value of the various investments owned by the user, the percentage of the types of financial instruments owned by the user, the types of investments interested by the user based on historical information, and the user's portfolio of investments.

When one or more products and/or services offered by the financial institution are highly correlated to the products and/or services that the user is interested in, information regarding the one or more products and/or services may be transmitted to the smart TV for display onto the second subscreen. For example, a television program such as a financial news program may provide earnings reports of various stocks. The audio content recognition hardware and/or software recognizes the names of the stocks and determines whether the various stocks may be of interest to the user based on his financial profile. The one or more stocks may be owned by the viewer.

When the WCD and/or server of the financial institution has determined that the one or more stocks are of interest to the user, a request to obtain additional information associated with the one or more products and/or services may be generated. The request may comprise a signal that may be transmitted by the WCD to the financial institution's server. In response to the signal, the server may transmit additional information to the user for display on the second subscreen of the smart TV. The server may transmit the financial information directly to the smart TV or via the WCD. The server may transmit the financial information after authentication takes place between the WCD and the smart TV. The WCD and the smart TV may pair with each other in the authentication process.

Figure 3:
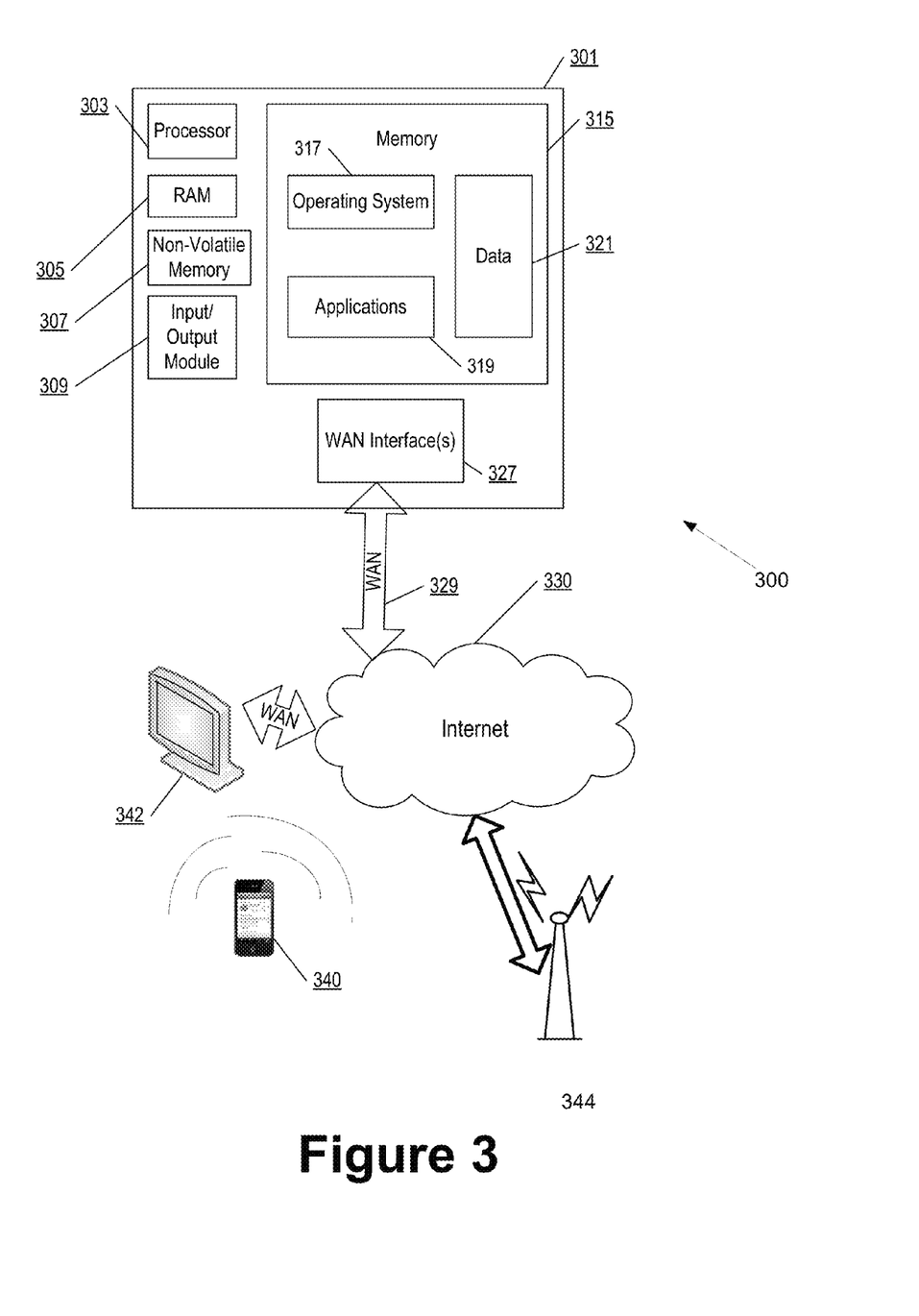
FIG. 3 is a block diagram of a suitable computing system environment that may be used to provide data corresponding to one or more products and/or services that may be of interest to a user of the smart TV and/or the wireless communication device previously described in connection with FIG. 1, in accordance with an exemplary embodiment.

FIG. 3 is a block diagram of a suitable computing system environment 300 that may be used to provide data corresponding to one or more products and/or services that may be of interest to a user of the smart TV and/or the wireless communication device previously described in connection with FIG. 1, in accordance with an exemplary embodiment. The computing system environment 300 is only one example of a suitable computing environment and is not intended to suggest any limitation as to the scope of use or functionality contained in the disclosure. The computing system environment 300 should not be interpreted as having any dependency or requirement relating to any one or combination of components shown in the illustrative computing system environment 300.

The computing system environment 300 comprises a computing system 301 and one or more computing devices 340, 342. Computing device 340 may comprise a wireless computing device as shown. Computing device 340 may comprise any portable wireless device configured to run one or more applications for providing a number of features and functionalities. The computing device 340 may comprise a mobile telephone, smartphone, or any other handheld device capable of wireless communication using protocols such as Wi-Fi, Bluetooth, and the like.

Computing device 342 may comprise a digital appliance such as a smart TV that was previously described in connection with FIG. 1, for example. The computing system 301 may include, but is not limited to, one or more personal computers (PCs), one or more server computers (i.e., servers), one or more hand-held or laptop devices, one or more multiprocessor systems, one or more microprocessor-based systems, one or more network PCs, one or more minicomputers, one or more mainframe computers, one or more distributed computing environments that include any of the above systems or devices, and the like. As was previously described in connection with FIG. 2, the computing system 301 may comprise the server at the financial institution.

The computing system environment 300 includes a computing system 301 wherein the processes discussed herein may be implemented. The computing system 301 may comprise a server having a processor 303 for controlling overall operation of the computing system 301 and its associated components, including random-access memory (RAM) 305, read-only memory (ROM) or non-volatile memory 307, communications module 309, and memory 315. Processor 303 and its associated components may allow the computing system 301 to execute a series of computer-readable instructions related to performing a method for displaying financial information to the computing devices 340, 342.

The computing system 301 may receive a request from one or both computing devices 340, 342 to provide financial information relevant to the interest of the user of the computing devices 340, 342. The one or more applications 319 may comprise computer-readable instructions executed by the processor 303 for providing, determining, and transmitting financial information to the viewer. The one or more applications 319 may be stored in the memory 315 and may be executed by the processor 303. The one or more applications may comprise algorithms for performing audio content recognition of audio signals or waveforms, correlation of the recognized content to a database of customer profiles, and transmission of data associated with one or more products and/or services associated with the correlation.

Processor 303 may also direct computing system 301 to interact and communicate with computing devices 340, 342. The computing devices 340, 342 may comprise client devices for running one or more client applications under direction of the computing system 301. The one or more client applications may implement a process for recognizing and determining the audio content of the programming delivered by the smart TV to the user or viewer, for example. One or more products and/or services described or presented in the audio content may correlate well with the interests of the viewer or user of the computing devices 340, 342.

The one or more products and/or services may be financial products and/or services that a financial organization may provide to the user, and as a consequence, information related to these one or more products and/or services may be presented to the user. The financial organization may be associated with the viewer's or user's deposit accounts or investment accounts. The user may currently have a banking relationship with the financial organization. The viewer and/or user may have downloaded an application into his or her wireless communication device as a way to access deposit and/or investment accounts. The application may be provided by the financial organization as a tool for use by its customers. The tool may be downloaded into the wireless communication device (WCD) and executed by a processor resident in the WCD.

The computer-readable instructions stored in the RAM 305 or the memory 315 may be executed by the processor 303. A user or operator of the computing system 301 and/or computing devices 340, 342 may provide input data and/or commands for running the one or more applications 319. The input data may be used by the processor to control the execution of the computer-executable instructions stored in memory 315. The input data may also be stored in memory 315 or in a data storage device 321. While FIG. 3 illustrates the one or more applications 319 as being resident in the memory 315, alternatively, the one or more applications 319 may also be resident within the data storage device of the computing devices 340, 342. The memory 315 and/or storage device 321 may comprise one or more drives, such as one or more portable hard disk drives, for example.

The random access memory (RAM) 305 may store data used by the one or more applications while the computing system 301 is executing the computer-executable instructions by the processor 303. The read-only memory (ROM) 307 may store data which is regularly used by the operating system 317. The operating system may be stored in the memory 315.

Computing system 301 typically includes a variety of computer readable media. Computer readable media may be any available media that may be accessed by computing device 301 and may include both volatile and nonvolatile media, removable and non-removable media. By way of example, and not limitation, the computer-readable media may comprise a combination of computer storage media and communication media. The memory 315 and/or data storage device 321 may comprise computer readable media. The computer readable media may comprise one or more hard disk drives, for example. The computing system 301 may be owned and/or operated by the financial organization at which the viewer's bank accounts are located. Computer readable media may be implemented in any method or technology for storage of information such as computer readable instructions, data structures, program modules, or other data. Computer readable media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store desired information that can be accessed by the computing system 301 and/or computing devices 340, 342.

Communications input/output module 309 may include a microphone, keypad, touch screen, and/or stylus through which a user of computing system 301 may provide input, and may also include one or more speakers for providing audio output and a video display device for providing textual, audiovisual and/or graphical output.

Computing system 301 may operate in a networked environment supporting connections to one or more remote computing devices, such as computing devices 340, 342. Each of the computing devices 340, 342 may include many or all of the elements described with regard to computing system 301.

The network connections depicted in FIG. 3 include wide area networks (WANs) 329 but may also include any other types of networks. When used in a WAN networking environment, the computing system 301 may include a modem in the communications module 309 or other means for establishing communications over the WAN 329 by way of the WAN interface 327. It will be appreciated that the network connections shown are illustrative and other means of establishing a communications link between the computing devices may be used. Various well-known protocols such as TCP/IP, Ethernet, FTP, HTTP and the like may be used, and the computing system 301 may be operated in a client-server configuration.

The one or more application programs 319 used by the computing system 301, according to an illustrative embodiment, may include computer-executable instructions for invoking user functionality related to communications including, for example, email, short message service (SMS), downloading and using web based applications. In addition, the application programs 319 may include computer-executable instructions for invoking one or more of the functions, steps, and/or processes described in FIGS. 4 and 5.

Although not required, various aspects of the invention, as described herein, may be embodied as a method, a computing system, or as a computer-readable media storing computer-executable instructions. For example, a computer-readable media may store instructions that, when executed by one or more processors, causes an apparatus or system to perform steps of a method or process in accordance with aspects of the disclosed embodiments. For example, aspects of the method steps disclosed herein may be executed on a processor 303 resident in the computing system 301. Such a processor may execute computer-executable instructions stored on a computer-readable media.

As illustrated, a cellular tower or repeater 344 may be used to communicatively couple the wireless computing device 340 to the computing system 301. The cellular tower 344 may be connected to the Internet 330 as shown in FIG. 3.

Figure 4:
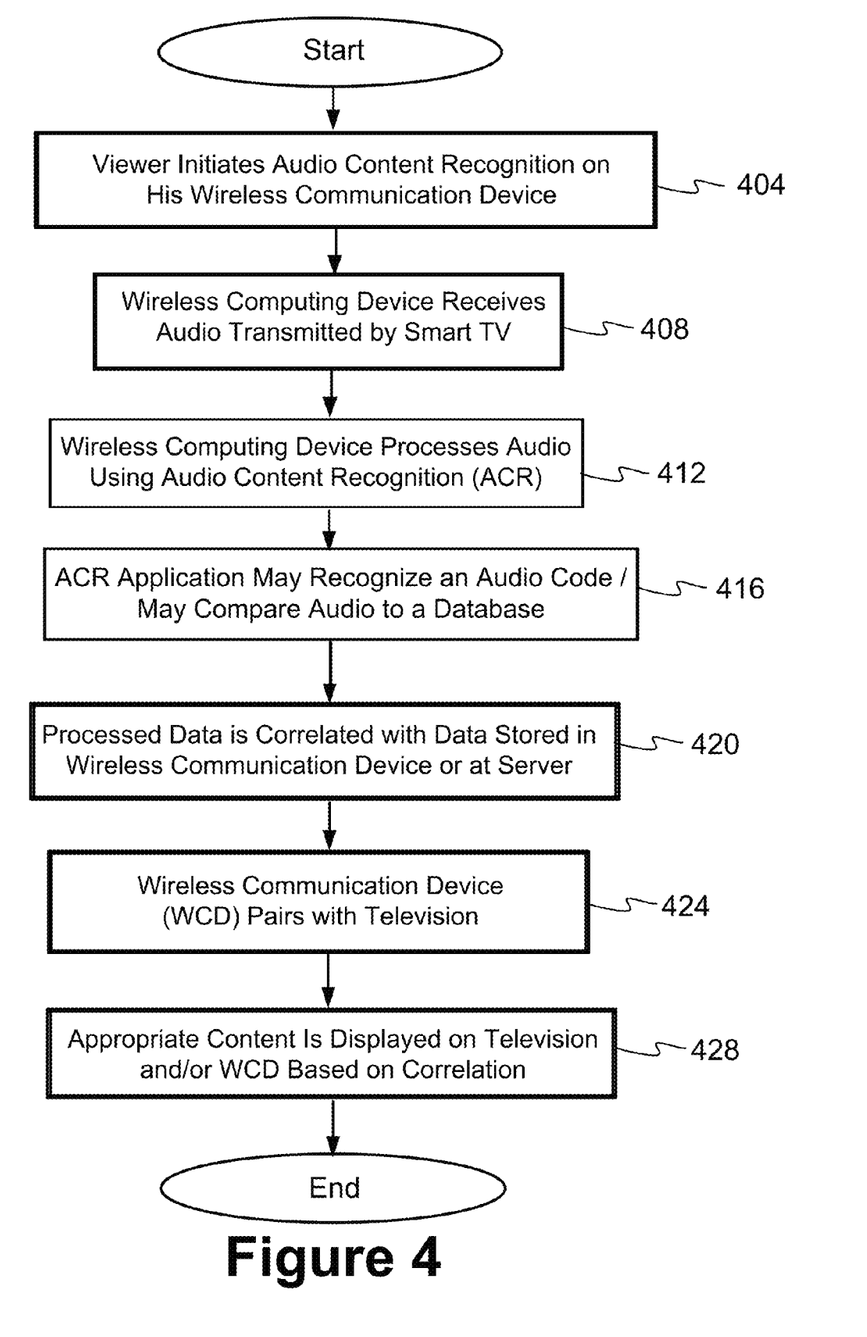
FIG. 4 is an operational flow diagram illustrating how audio content recognition is used to automatically display information of interest to a viewer on a display of a computing device.

FIG. 4 is an operational flow diagram illustrating how audio content recognition is used to automatically display information of interest to a viewer on a display of a computing device. The computing device may comprise a digital appliance such as a smart TV as was previously described in connection with FIG. 1. The smart TV may receive programming by way of a set top box provided by a cable operator. The set top box may provide on demand access to programming which may be selected by the viewer using a remote control. The programming may comprise one or more financial news programs, for example.

The set top box may also provide an electronic program guide (EPG) for allowing the viewer to select one or more financial programs over one or more channels. The financial programs may be recorded using a digital video recorder integrated within the set top box for future use by the viewer. The smart TV may be communicatively coupled to one or more multimedia receivers which may provide multimedia programming via a connection to the Internet. The one or more multimedia receivers may be controlled and operated by a remote control.

In one embodiment, the smart TV may comprise a display that is capable of presenting the received programming in a first screen and the information of interest in a second screen. In another embodiment, the smart TV may be capable of presenting the received programming in a first screen and a plurality of information of interest in a plurality of additional screens. Accordingly, the smart TV may provide a multiple split-screen feature for displaying multiple screens in various screen sizes.

At step 404, a viewer of the smart TV may be watching a program such as a financial program. While watching the program, the viewer may have access to a wireless communication device, such as a smartphone. While watching the financial program, the viewer may initiate execution of an audio content recognition (ACR) application using his smartphone. In one embodiment, an initialization of the ACR application resident in the wireless communication device may trigger the wireless communication device to analyze and process any audio waveform received. In an alternate embodiment, the viewer may initiate execution of an ACR application resident in a computing device (or server) located at an organization. The server may receive the audio signal generated by the smart TV by way of the wireless communication device. The viewer may initiate execution of the ACR application by making a selection on his wireless communication device (e.g., smartphone). The ACR application may process the audio waveform to determine its audio content and, in particular, determine whether one or more products and/or services described in the audio programming is offered by a financial institution.

After determining the one or more products and/or services provided or offered by the institution, the ACR application may correlate these products and/or services to a predetermined profile associated with the viewer. The profile may comprise a list of products and/or services that the viewer is interested in. The initialization procedure may comprise inputting authenticating information related to the user of the smartphone. While providing the authenticating information, the user of the smartphone may also provide information indicating the identity of the viewer of the television programming.

By indicating the identity of the viewer, the smartphone may gain access to the profile of the indicated viewer at the viewer's financial organization (via a database server resident at the financial organization) and be able to correlate the one or more products and/or services described in the audio with the viewer's interests found in the profile. While the profile may be accessed at the server, it is contemplated that the most recent profile of one or more viewers may be saved at the wireless communication device (e.g., the smartphone) and may be utilized if the profile database at the server is inaccessible. The authentication procedure may include inputting one or more passwords and or personal identification numbers (PINs) using a keyboard of the smartphone.

Next, at step 408, the wireless communication device may receive the audio using its integrated microphone. The viewer may configure the microphone's sensitivity based on the volume and quality of the audio signal received.

Thereafter, at step 412, the ACR application may utilize one or more signal processing algorithms to analyze the audio and to determine the audio content in the audio signal received by the wireless communication device. The ACR application may also recognize audio watermarks which may have been embedded into the audio signal. Data may be embedded into an audio track. The audio track may be slightly modified in a defined manner such that the human ear cannot perceive an acoustic difference. The ACR application may be able to filter these audio watermarks from the audio track to determine the type of audio content being transmitted by the smart TV.

At step 416, the ACR application may be able to determine content of the audio signal by way of watermarking or fingerprinting, for example. For example, the audio content may comprise an embedded audio code that indicates the type of program it is associated with. The embedded audio code may be recognized and interpreted by the ACR application. In addition, the ACR application may be capable of comparing the audio characteristics of the audio content to a predetermined library to recognize and determine the audio content provided. The ACR application may determine whether the audio content comprises one or more products and/or services offered by an organization. The organization may comprise a financial institution such as a bank in which the viewer has his/her accounts. The ACR application may also perform an analysis of the characteristics of the audio waveforms. Thereafter, the characteristics may be compared to a database of characteristics found in a large reference library of pre-indexed content. The foregoing techniques may be used to determine the content of the audio received by the wireless communication device.

Next, the process continues with step 420, in which the content is correlated with data stored in the wireless communication device or with data stored in a server of an organization or institution. The server may comprise the computing system previously described in connection with FIG. 3. The organization or institution may comprise a financial institution, such as a bank, at which the viewer has a deposit account or any type of financial account. The data stored in the wireless communication device may comprise a profile that specifies the type of financial investments the viewer currently has. The financial investments may be categorized by type and quantity, for example. The profile may include the viewer's predetermined interest levels for each product and/or service the financial organization offers. The interest levels may have been determined based on historical information obtained from the viewer. Each product and/or service may be correlated with the content extracted by the ACR application.

In one embodiment, when the correlation of a product or a service with the content is above a particular threshold value, for example, the wireless communication device may generate an indication that the products and/or services may be of interest to the viewer. As a consequence, data or information related to the product and/or service may be tagged and stored for transmission to the viewer. Thus, data related to a subset of the products and/or services offered by the financial organization or institution may be of interest to the viewer. The data or information related to the product and/or service may be obtained from the server of the financial organization.

Next, at step 424, the viewer may pair the wireless communication device with the smart TV. Both the smart TV as well as the wireless communication device may be capable of communicating using a wireless communication protocol. Pairing may allow the wireless communication device to obtain the IP address of the smart TV. The IP address may be transmitted to the server such that the server may be able to transmit the data to the smart TV. The pairing may occur by way of using a protocol such as the Bluetooth protocol, for example. When paired, the wireless communication device or smartphone, for example, may acquire and transmit the data or information related to the products and/or services to the smart TV. In some embodiments, the server, by way of the Internet may provide the data or information related to the products and/or services that may be of interest to the viewer. The data may be received by the smart TV, the set top box, or by a multimedia receiver. The set top box and multimedia receiver are connected to the smart TV. Each of the smart TV, the set top box, and the multimedia receiver may have a connection to the Internet.

Thereafter, at step 428, the smart TV may receive the product and/or service information from either the server or the wireless communication device. The server may transmit the tagged data by way of the Internet to the cable operator. The cable operator may transmit the data to the set top box by way of a coaxial connection. In some aspects, the data may be transmitted to the multimedia receiver via the Internet by way of an Ethernet connection. In another aspect, the data may be transmitted directly to the smart TV by way of an Ethernet connection. After receiving the data, the multimedia receiver may provide the data to the smart TV. The data may be displayed on a split screen of the smart TV. For example, the data may be displayed on the right portion of the split screen while typical programming may be displayed on the left portion of the split screen. By way of receiving the data, the viewer may learn more about the financial products and/or services the financial organization has to offer and may be inclined to purchase such products and/or services. In some aspects, the data or information related to the products and/or services offered by the financial organization may also be received by the wireless communication device and displayed on the screen of the wireless communication device.

In another embodiment, the smart TV may comprise a memory that stores an application that is capable of translating an electronic waveform associated with the audio. When initiated by a viewer, the smart TV may internally process the electronic waveform using the application to determine the types of products and/or services that are presented by the television programming. The viewer may initiate processing of the electronic waveform by the smart TV by way of using a remote control, for example. The smart TV may automatically determine one or more products and/or services, based on the television programming delivered to the viewer that may be of interest to the viewer. Processing of the electronic waveform may be initiated by inputting authenticating information related to the user of the smart TV. While providing the authenticating information, the user of the smartphone may also provide information indicating the identity of the viewer of the television programming. By indicating the identity of the viewer, the smart TV may gain access to the profile of the indicated viewer at the viewer's financial organization (via a database server resident at the financial organization) and be able to correlate the one or more products and/or services described in the audio with the viewer's interests. The authentication procedure may include inputting one or more passwords and or personal identification numbers (PINS) by using a screen visible keyboard on the smart TV.

Figure 5:
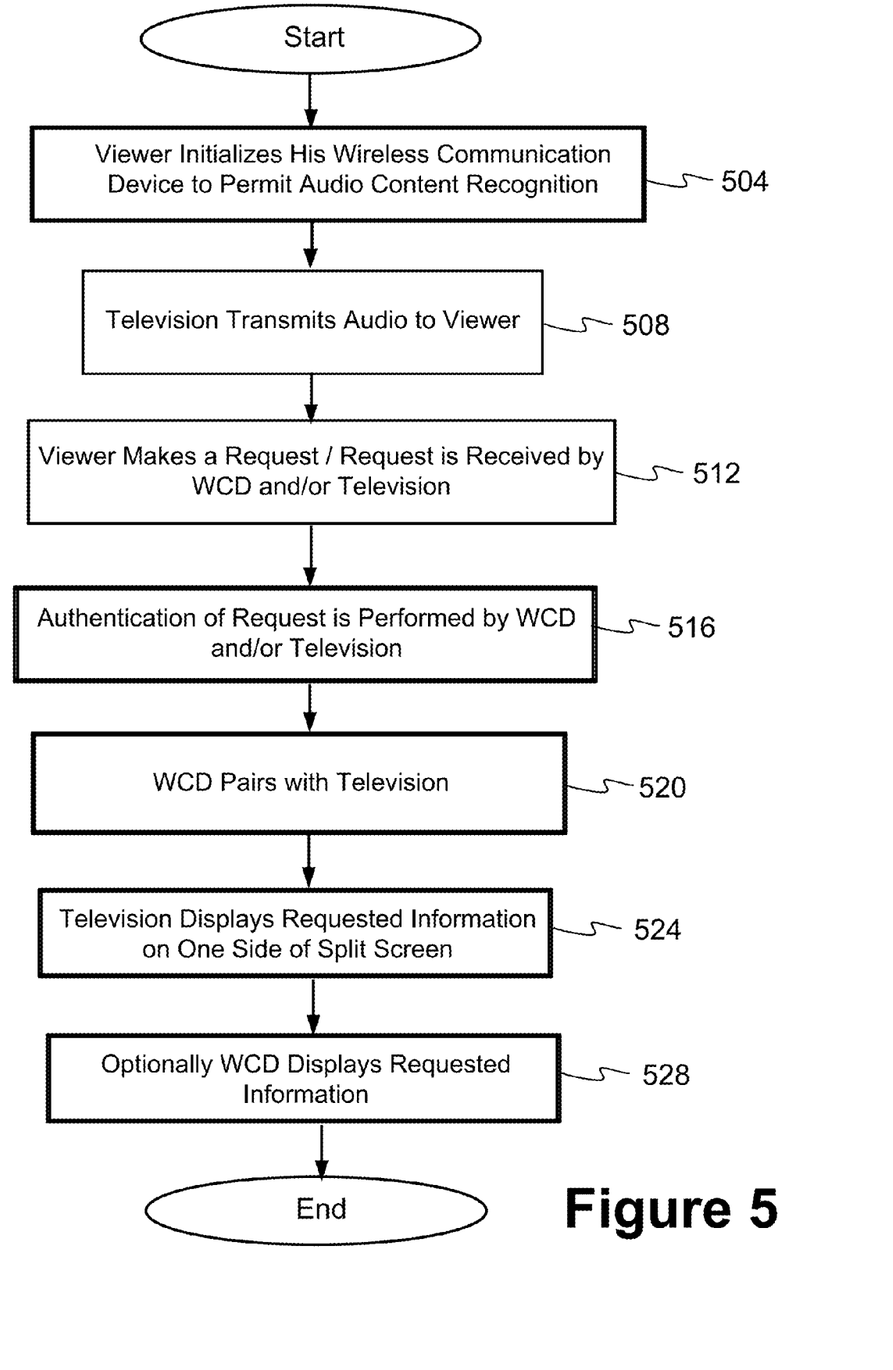
FIG. 5 is an operational flow diagram illustrating how audio content recognition is used to display information of interest to a viewer when a viewer makes an audible query to one or more computing devices.

FIG. 5 is an operational flow diagram illustrating how audio content recognition is used to display information of interest to a viewer when a viewer makes an audible query to one or more computing devices. The computing device may comprise a digital appliance such as a smart TV as was previously described in connection with FIG. 1. The computing device may comprise a wireless communication device as was previously described in connection with FIG. 1. The smart TV may receive programming by way of a set top box provided by a cable operator. The set top box may provide on demand access to programming which may be selected by the viewer using a remote control.

The programming may comprise one or more financial news programs, for example. The set top box may also provide an electronic program guide (EPG) for allowing the viewer to select one or more financial programs over one or more channels. The financial programs may be recorded using a digital video recorder integrated within the set top box for future use by the viewer. The smart TV may be communicatively coupled to one or more multimedia receivers which may provide multimedia programming via a connection to the Internet. The one or more multimedia receivers may be controlled and operated by a remote control.

At step 504, a viewer of the smart TV may be watching a program such as a financial program. While watching the program, the viewer may have access to a wireless communication device, such as a smartphone. While watching the financial program, the viewer may initiate execution of an audio content recognition (ACR) application using his smartphone. In one embodiment, an initialization of the ACR application resident in the wireless communication device may trigger the wireless communication device to analyze and process any audio waveform received. The viewer may initiate execution of the ACR application by making a selection on his wireless communication device (e.g., smartphone). The ACR application may process any audio waveform it receives to determine its audio content.

The initialization procedure may comprise inputting authenticating information related to the user of the smartphone. While providing the authenticating information, the user of the smartphone may also provide information indicating the identity of the viewer of the television programming. By receiving inputs regarding the identity of the viewer, the smartphone may be able to gain access to account information at one or more financial organizations. In response, the smartphone may provide identifying information associated with one or more investment accounts at the one or more financial organizations. A user of the smartphone may need to provide authenticating information to the one or more financial organizations in order to be able to access account information. The authentication procedure may include inputting one or more passwords and or personal identification numbers (PINs) using a keyboard of the smartphone.

Next, at step 508, the television or smart TV transmits programming to a viewer who has access to his wireless communication device (WCD). The program may comprise a news program or a financial program. While watching a financial program, the viewer may wish to access certain financial data from his accounts.

At step 512, the viewer may make an audible request using his wireless communication device. The viewer may request, using his/her wireless communication device, to view one or more of his investment accounts. For example, the viewer may utter a request to his smartphone to retrieve his/her portfolio of investments in his/her brokerage account held at the financial organization. In some aspects, the user may request that he be connected to a service advisor who can help him immediately.

Next, at step 516, the ACR application may utilize an algorithm to authenticate any audible voice request from the viewer. The algorithm may analyze the voice characteristics of the audio waveform to determine if the request is from an authorized person. The voice characteristics of the utterance may be analyzed and compared to a predetermined library of voice characteristics to determine whether to provide access to financial information in an account.

Thereafter, at step 520, the viewer or user of the wireless communication device may command the wireless communication device to pair with the smart TV. Both the smart TV as well as the wireless communication device may be capable of communicating using a wireless communication protocol. The pairing may occur by way of using a protocol such as the Bluetooth protocol, for example. When paired, the wireless communication device or smartphone, for example, may acquire and transmit the data or information requested by the user or viewer. The data or information may comprise account information associated with the user's investments at the financial institution. In some embodiments, the server, by way of the Internet may provide the data or information related to the request. The data or information may be received by the smart TV, the set top box, or by a multimedia receiver. The set top box and multimedia receiver are connected to the smart TV. Each of the smart TV, the set top box, and the multimedia receiver may have a connection to the Internet.

Next, at step 524, the smart TV may receive the requested account information from either the server or the wireless communication device. The server may transmit the data by way of the Internet to the cable operator. The cable operator may transmit the data to the set top box by way of a coaxial connection. In some aspects, the data may be transmitted to the multimedia receiver via the Internet by way of an Ethernet connection. In another aspect, the data may be transmitted directly to the smart TV by way of an Ethernet connection. After receiving the data, the multimedia receiver may provide the data to the smart TV. The data may be displayed on a split screen of the smart TV. For example, the data may be displayed on the right portion of the split screen while typical programming may be displayed on the left portion of the split screen. By way of receiving the data, the viewer may be able to assess the investments and any other information related to his/her portfolio while he or she is watching his/her financial program on the smart TV.

At step 528, the user may configure his wireless communication device to receive the requested account information from a server at the financial institution. After receiving the requested information, the wireless communication device may display the information on the screen of the wireless communication device.

The foregoing presents a simplified summary of the disclosure in order to provide a basic understanding of some aspects. It is not intended to identify key or critical elements of the invention or to delineate the scope of the invention. Although not required, the various aspects described herein may be embodied as a method, a data processing system, or as a computer-readable medium for storing computer-executable instructions that are capable of being executed by one or more processors of a computer system or a distributed system of computers or computing devices. Aspects of the invention have been described in terms of illustrative embodiments thereof. Numerous other embodiments, modifications, and variations within the scope and spirit of the disclosed invention are possible from a review of this entire disclosure. For example, the steps illustrated in the illustrative figures may be performed in other than the recited order, and that one or more steps illustrated may be optional in accordance with aspects of the disclosure. While some embodiments have been described with respect to specific examples, other embodiments include numerous variations and permutations of the above described systems and techniques.

Although the subject matter has been described in language specific to structural features and/or methodological acts, it is to be understood that the subject matter defined in the appended claims is not necessarily limited to the specific features or acts described above. Rather, the specific features and acts described above are disclosed as illustrative forms of implementing the claims.

What is claimed is:

1. A system comprising:
   a multimedia viewing device generating audio content including an audio signal, the multimedia viewing device having a display and at least a first processor, at least a first memory for storing computer executable instructions that, when executed by the at least a first processor, cause the multimedia viewing device to:
 identify a viewer of the multimedia viewing device based on facial recognition of the viewer,
 wherein said multimedia viewing device provides a split screen view on the display of the multimedia viewing device, the split screen view including a first portion and a second portion;
a wireless communication device paired to the multimedia viewing device, the wireless computing device including:
 at least a second processor; and
 at least a second memory for storing computer executable instructions, that, when executed by the at least a second processor cause the wireless computing device to:
  process the audio signal received from the multimedia viewing device having a display, to perform audio content recognition of said audio signal;
  determine whether said recognized audio content comprises one or more products or services provided by a financial institution;
  correlate said one or more products or services with a financial profile of the identified viewer of the multimedia viewing device, the viewer being associated with the wireless communication device, the financial profile including financial characteristics of the viewer;
  determine a subset of said one or more products or services, the subset representing products or services that are provided by the financial institution and are of interest to said viewer based on said correlation exceeding a predetermined threshold; and
  transmit data associated with said subset from the wireless communication device to the multimedia viewing device from which the audio content was generated for displaying said subset on the display of the multimedia viewing device from which the audio was generated, the subset being displayed on one of the first portion and the second portion simultaneously with content displayed on the other of the first portion and the second portion, the content displayed on the other of the first portion and the second portion being content from which the audio content was received.

2. The system of claim 1 wherein said audio content recognition is performed at one of: a) the wireless communication device and b) a server.

3. The system of claim 1 wherein said multimedia viewing device comprises a smart television and wherein said audio signal is generated by said smart television.

4. The system of claim 1 wherein said financial profile includes a list of products and services in which said viewer is interested.

5. The system of claim 1, wherein the financial profile of the viewer includes a type of financial investment the viewer currently has.

6. The system of claim 1, wherein the financial profile of the viewer includes a predetermined interest level of the viewer in one or more products or services offered by an entity.

7. The system of claim 6, wherein the predetermined interest levels are determined based on historical information of the viewer.

8. A method comprising:
 identifying, by a multimedia viewing device having a display, a viewer of the display, wherein said multimedia viewing device provides a split screen view on the display of the multimedia viewing device, the split screen view including a first portion and a second portion;
 receiving, by a wireless communication device having a least one processor from the multimedia viewing device, audio content generated by the multimedia viewing device, the audio content including an audio signal, the wireless communication device being paired to the multimedia viewing device;
 performing, by the wireless communication device, audio content recognition of the audio signal from the audio content generated by the multimedia viewing device;
 first determining whether said recognized audio content describes one or more products or services provided by a financial institution;
 correlating said one or more products or services with a financial profile of the viewer of the multimedia viewing device, the viewer being associated with the wireless communication device, the financial profile including financial characteristics of the viewer;
 second determining a subset of said one or more products or services representing products or services that are provided by the financial institution and are of interest to said viewer based on said correlation exceeding a predetermined threshold; and
 transmitting data associated with said subset from the wireless communication device to the multimedia viewing device from which the audio content was generated for displaying said subset on a display of the multimedia viewing device, the subset being displayed on one of the first portion and the second portion simultaneously with content displayed on the other of the first portion and the second portion, the content displayed on the other of the first portion and the second portion being content from which the audio content was received.

9. The method of claim 8 wherein said wherein said audio content recognition is performed at one of: a) the wireless communication device and b) said server.

10. The method of claim 8 wherein said multimedia viewing device comprises a smart television and wherein said audio signal is generated by said smart television.

11. The method of claim 8 wherein said financial profile includes a list of products and services in which said viewer is interested.

12. A non-transitory computer-readable storage media having stored thereon, a computer program having at least one code section for processing data, said at least one code section being executable by one or more processors of one or more computing devices for causing said one or more computing devices to:
 identify, by a multimedia viewing device having a display, a viewer of the multimedia viewing device, wherein said multimedia viewing device provides a split screen view on the display of the multimedia viewing device, the split screen view including a first portion and a second portion;
 receive, by a wireless communication device from the multimedia viewing device, audio content generated by the multimedia viewing device, the audio content including an audio signal, the wireless communication device being paired to the multimedia viewing device;

process, by the wireless communication device, the audio signal from the audio content generated by the multimedia viewing device to perform audio content recognition of said audio signal;

determine whether said recognized audio content comprises one or more products or services provided by a financial institution;

correlate said one or more products or services with a financial profile of the viewer of the multimedia viewing device, the viewer being associated with the wireless communication device, the financial profile including financial characteristics of the viewer;

determine a subset of said one or more products or services representing products or services that are provided by the financial institution and are of interest to said viewer based on said correlation exceeding a predetermined threshold; and transmit data associated with said subset from the wireless communication device to the multimedia viewing device from which the audio content was generated for displaying said subset on a display of the multimedia viewing device, the subset being displayed on one of the first portion and the second portion simultaneously with content displayed on the other of the first portion and the second portion, the content displayed on the other of the first portion and the second portion being content from which the audio content was received.

13. The non-transitory computer-readable storage media of claim 12 wherein said audio content recognition is performed at one of: a) the wireless communication device and b) a server.

14. The non-transitory computer-readable storage media of claim 12 wherein said multimedia viewing device is a smart television and the audio signal is generated by said smart television.

15. The non-transitory computer-readable storage media of claim 12 wherein said financial profile includes a list of products and services in which said viewer is interested.

* * * * *